May 3, 1932.  W. E. CRAWFORD  1,857,044
ELECTRICAL WELDING APPARATUS
Filed Sept. 17, 1928
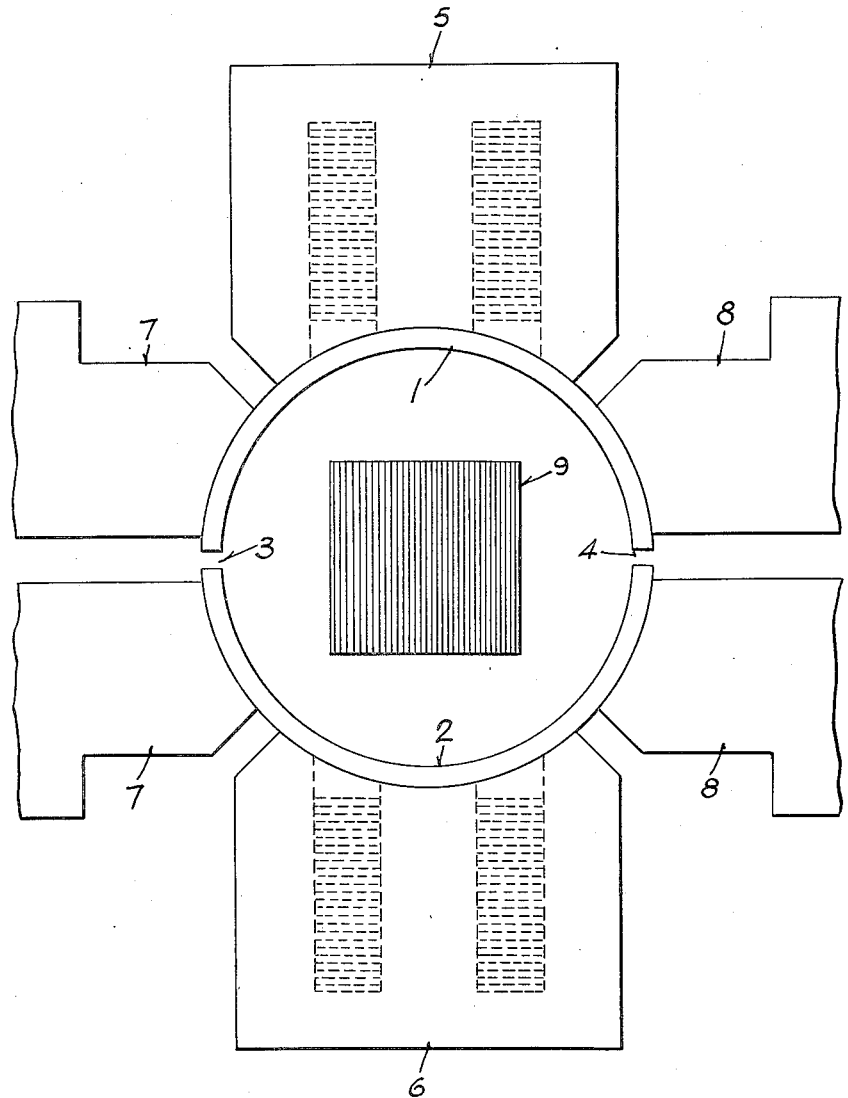
INVENTOR.
WILLIAM E. CRAWFORD
BY  W. J. Woolard
ATTORNEY.

Patented May 3, 1932

1,857,044

UNITED STATES PATENT OFFICE

WILLIAM E. CRAWFORD, OF WAUWATOSA, WISCONSIN, ASSIGNOR TO A. O. SMITH CORPORATION, OF MILWAUKEE, WISCONSIN, A CORPORATION OF NEW YORK

ELECTRICAL WELDING APPARATUS

Application filed September 17, 1928. Serial No. 306,420.

This invention relates to an electrical welding apparatus.

The apparatus is particularly applicable to butt or flash welding pipe formed from longitudinal sections having abutting edges which provide a plurality of longitudinal seams to be welded.

Heretofore this pipe has not been susceptible to welding by momentarily and simultaneously flashing an electric arc along the seams to heat the edges of the pipe sections and then pressing the edges together.

The object of my present invention is to provide a simple and efficient apparatus for simultaneously welding a plurality of longitudinal seams in a pipe.

Another object is to provide a multiple flash welding apparatus.

According to my invention the apparatus has means to supply welding currents simultaneously to the seams to be welded and means on the outside of the pipe to hold the sections thereof and control the opening of the seams therein.

In another phase, the invention contemplates supplying separate welding currents to the several seams and interposing an impedance therebetween to prevent leakage of current through the pipe.

The invention is a modification of the invention set forth and claimed in my co-pending application Serial No. 306,421, filed September 17, 1928.

The invention may be more readily understood by referring to the accompanying drawing in which an end elevation of an apparatus embodying the invention is diagrammatically illustrated.

The pipe has a plurality of longitudinal sections 1 and 2 formed from sheet metal and having the edges thereof in abutting alignment to provide a plurality of longitudinal seams 3 and 4 to be welded.

The sections 1 and 2 are held in complementary relation by electro-magnets 5 and 6 respectively. These magnets have concave pole faces to receive the curved sections and hold them from deformation during the welding operation.

The magnets are relatively movable toward and away from each other to control the opening of the seams 3 and 4 during the welding operation and to facilitate placing the pipe sections therebetween.

The seams 3 and 4 are supplied with separate welding currents by separate sets of electrode contact blocks 7 and 8 respectively.

The electrodes are arranged on opposite sides of the seams and adjacent thereto, and are pressed into contact with the pipe to provide a good electrical contact therewith.

The magnets hold the pipe against the pressure applied by the electrodes.

Where separate welding currents of different phases are supplied to the seams a soft iron core 9 is inserted in the pipe to interpose an impedance to prevent the leakage of current through the pipe from the electrodes 7 to the electrodes 8, and vice versa.

Of course a single transformer may be used to supply both seams with current.

The several parts of the apparatus may extend the entire length of the pipe to be welded, or they may be spaced in sections along the pipe.

The apparatus thus provided may be employed to butt weld the seams 3 and 4, but it is particularly adapted to flash welding the seams. By this method an electric arc is momentarily flashed along the seams to heat the edges of the pipe sections to welding temperature and then the edges are pressed together to unite the same instantaneously throughout their entire contiguous length.

The invention provides an apparatus which will weld a plurality of longitudinal seams in this manner simultaneously.

The apparatus is particularly advantageous where the pipe is so small in diameter that the seam cannot be properly controlled if the pipe is made from a single piece of sheet metal, and also where the pipe is too large to be made from a single sheet of metal.

The invention contemplates the welding of any number of longitudinal seams simultaneously and the making of pipe from any number of longitudinal sections.

Having thus described my invention, what I claim and desire to secure by Letters Patent of the United States, is:

1. In an apparatus for electrically welding a plurality of separate seams in an article simultaneously by the application of separate phase alternating currents from a single multiphase current source, a magnetic member arranged to impede the inter-flow of current through the article between the seams being welded.

2. An apparatus for electrically welding tubular articles having a plurality of longitudinal seams to be welded, comprising a multiphase source of welding current, means to distribute the several phase currents to separate seams being welded, and an impedance arranged to prevent flow of current through the article between the seams being welded.

3. An apparatus for electrically welding pipe formed of longitudinal sections having abutting edges which provide a plurality of longitudinal seams to be welded, comprising means to conduct separate welding currents to the seams to be welded, means on the outside of the pipe to hold the sections thereof in welding position, and means arranged inside the pipe to interpose an impedance therein and prevent the leakage of current therethrough.

In testimony whereof, I have signed my name at Milwaukee, this 14th day of September, 1928.

WILLIAM E. CRAWFORD.